(12) United States Patent
Adolphe

(10) Patent No.: US 9,076,142 B2
(45) Date of Patent: Jul. 7, 2015

(54) SMART ELECTRONIC WALLET OR SMART E-WALLET

(76) Inventor: Marsiste Adolphe, Freehold, NJ (US)

(*) Notice: Subject to any disclaimer, the term of this patent is extended or adjusted under 35 U.S.C. 154(b) by 685 days.

(21) Appl. No.: 13/458,660

(22) Filed: Apr. 27, 2012

(65) Prior Publication Data
US 2013/0080322 A1   Mar. 28, 2013

Related U.S. Application Data

(60) Provisional application No. 61/538,008, filed on Sep. 22, 2011.

(51) Int. Cl.
*G06Q 99/00* (2006.01)
*G06Q 20/36* (2012.01)
*G06Q 20/10* (2012.01)

(52) U.S. Cl.
CPC .............. *G06Q 20/36* (2013.01); *G06Q 20/367* (2013.01); *G06Q 20/105* (2013.01); *G06Q 20/3674* (2013.01)

(58) Field of Classification Search
CPC .... G06Q 20/105; G06Q 20/367; G06Q 20/36
USPC .................................................... 705/41, 65
See application file for complete search history.

(56) References Cited

U.S. PATENT DOCUMENTS

| | | | | |
|---|---|---|---|---|
| 5,578,808 | A * | 11/1996 | Taylor | 235/380 |
| 5,748,737 | A * | 5/1998 | Daggar | 705/41 |
| 6,763,463 | B1 * | 7/2004 | Guthery | 713/193 |
| 2001/0054148 | A1 * | 12/2001 | Hoornaert et al. | 713/172 |
| 2002/0062284 | A1 * | 5/2002 | Kawan | 705/43 |
| 2004/0128256 | A1 * | 7/2004 | Krouse et al. | 705/65 |
| 2006/0219776 | A1 * | 10/2006 | Finn | 235/380 |
| 2008/0126260 | A1 * | 5/2008 | Cox et al. | 705/67 |

* cited by examiner

*Primary Examiner* — James D Nigh

(57) ABSTRACT

The electronic wallet comprises a card duplicator, an electronic wallet or e-wallet, and an e-card. The card duplicator and the electronic wallet or e-wallet comprises a personalized authentication security card. Each electronic wallet or e-wallet has only one e-card. Single users are only required to have the electronic wallet or e-wallet. Business and family plans are required to have both the card duplicator and the electronic wallet or e-wallet. The card duplicator and the electronic wallet or e-wallet store credit card and personal data into the system. The e-card works as an interface device for the consumers. The e-card functions like normal credit card however the e-card is equipped with superior security system compared to a normal credit card.

19 Claims, 10 Drawing Sheets

SMART ELECTRONIC WALLET OR SMART E-WALLET

The current application claims a priority to the U.S. Provisional Patent application Ser. No. 61/538,008 filed on Sep. 22, 2011.

FIELD OF THE INVENTION

The present invention relates generally to an electric wallet that is able to read and upload a variety of information. The present invention is a unique system of apparatus that allows anyone to upload their bank cards, credit cards, medical insurance cards, food stamps, WIC, identification cards, stored Social Security numbers, school's identification card, driver's license information and picture, and any and all cards with a bar code or/and a magnetic strip of stored information. The invention also unloads or distributes any information upon the user's preference.

BACKGROUND OF THE INVENTION

Since the invention of the credit card, the number of people who use the credit cards and the number of credit card companies have been steadily increasing. One of the main priorities that all of those credit card companies have in common is to provide a secured credit card to their customers. The traditional credit card comprises personal information, card information, an electronic chip, a magnetic strip, and a signature strip. The traditional credit cards have very little protection when it comes to the security of the card or identity theft. A random person can easily use someone else's credit card within few seconds. Since the internet is now widely available to everyone in modern society, stealing credit card information or anonymously using some else's credit cards is a simple task. Most credit card companies charge a certain fee to ensure the protection of their customers. At the end of the day, the credit card users pay a premium fee to ensure the safety of their information. If the user loses their credit cards due to negligence, they must go through many time consuming steps to make sure their information is safe. There is a direct correlation between increasing credit card fraud and the increasing number of credit card users every day. Having a secured credit card with a secured electronic wallet solves many of these problems, and the consumers have one less problem to worry about.

DETAILED DESCRIPTIONS OF THE INVENTION

Figure 1:
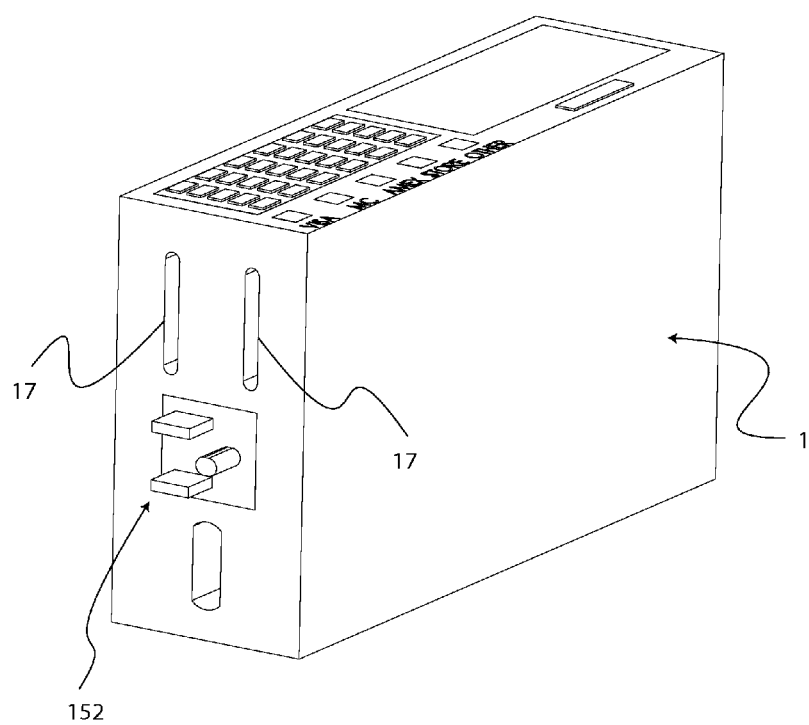
FIG. 1 is a perspective view of the card duplicator.

All illustrations of the drawings are for the purpose of describing selected versions of the present invention and are not intended to limit the scope of the present invention.

The present invention does not issue any credit cards, but allows the user to have a single card for all transaction instead of many different credit cards. The present invention protects the environment by eliminating the use of plastic products and/or trees which are used to produced the conventional cards and identification (ID) cards. The present invention is an apparatus and a system for converting all cards into one card system. The present invention comprises three main units and the three main units are listed below:

1. A card duplicator 1
2. An electronic wallet or e-wallet 4
3. An e-card 8

The e-card 8 connects with the electronic wallet or e-wallet 4. Each electronic wallet or e-wallet 4 is equipped with a single e-card 8. The electronic wallet or e-wallet 4 is the only device required for a single user, but family and business plans require the card duplicator 1. The family and business plans need one card duplicator 1 and multiple number of electronic wallets or e-wallets 4. The electronic wallet or e-wallet 4 and the card duplicator 1 are connected by a data cable. The number of electronic wallets or e-wallets 4 required for the single card duplicator 1 can be requested by the owner of the card duplicator 1. A personalized authentication security card (PASC) 53 is given to the owner of the electronic wallet or e-wallet 4. The personalized authentication security card (PASC) 53 is compatible only with the electronic wallet or e-wallet 4, however only the single users get the personalized authentication security card (PASC) 53. The family and business plans are given a business personalized authentication security card (BPASC) 19. The business personalized authentication security card (BPASC) 19 is compatible only with the card duplicator 1 and handle by the owner of the system. None of the electronic wallet or e-wallet 4 in the family and business plans get the personalized authentication security card (PASC) 53 because only the owner of the card duplicator 1 is authorized to make changes into the system.

The electronic wallet or e-wallet 4 and e-card 8 look slightly different from the current conventional wallets and credit cards, respectively. Furthermore, the electronic wallet or e-wallet 4 has far more embedded security features in order to protect personal data than the current conventional credit cards. Users of the present invention have peace of mind, while they are helping the environment to reduce the use of plastic. The electronic wallet or e-wallet 4 can be comfortable to carried by the users. Because of the present invention, bulkiness and misplacement of the important documents can be eliminated. A single button on the electronic wallet or e-wallet 4 loads the selected card's information to the e-card 8.

The businesses plan has high capacity, different codes, and added collective security, card duplicator 1 compare to the family plan which comprises a lower capacity. The card duplicator 1 has a different security codes along with different geographical/country locations. Different and longer alphanumerical codes are embedded in the business personalized authentication security card (BPASC) 19. The business personalized authentication security card (BPASC) 19 cannot be duplicated or modified. Each business plan has both the business information and the authorized user information embedded in to the system. The number of users per system is determined upon application/order. For even more security, business plan is able to upload many different credit cards to the card duplicator 1, but the owner of the card duplicator can limit the number of credit and debit cards seen by each employee.

The family plan is available also with the same interface as the business plan with a limited number of users. The card duplicator 1 is also required for the family plan. The head of household or owner of the card duplicator 1 can limit access or load only selected debit and credit cards for the each e-card 8. However, only the e-card 8 user's personal information is displayed in the e-card 8. The business individualized authentication security card (BPASC) 19 is also given to the owner of the family card duplicator 1.

The highly secured remote server or its affiliates have a dual backup system for data and information loaded in the card duplicator 1. In case of any emergency, a new identical system with different security codes can be forwarded to the owner within two days. Then the old system is automatically voided and non-operational, however the system does not void the old e-card 8. If the owner wants the old e-card 8 to be voided, it can also be achieved. Each system has two authenticable alpha-numerical codes and one serial number set by country code for security.

The electronic-wallet or e-wallet 4 along with the e-card 8 is a duplicating system with high security. The present invention can be voided, if any individual or businesses involved in illegal activity or attempt to illegally duplicating the system. The agreement between the credit card company and the issuer is the only legal agreement. All other data including spending limit and daily limitation depend on the card issuer, and the present invention does not interfere with the above agreements. The electronic wallet or e-wallet 4 does not interfere or mediate the legal agreement between the user and the issuing credit, debit, bank, store or any financial institutional entities. Any dispute regarding the issuer and the merchant must be resolved by the users.

The personalized authentication security card (PASC) 53 and the business individualized authentication security card (BPASC) 19 cannot be duplicated. The personalized authentication security card (PASC) 53 only works with that specific assigned electronic wallet or e-wallet 4, and the e-card 8 which has the same personal alpha-numerical coded pre-loaded data. The business personalized authentication security card (BPASC) 19 only works with that specific assigned system of card duplicator 1 and, the e-card 8 which has the same personal alpha-numerical coded pre-loaded data. Both the personalized authentication security card (PASC) 53 and the business personalized authentication security card (BPASC) 19 must be inserted into the specific system prior to making any changes, such as add or delete any data.

Figure 2:
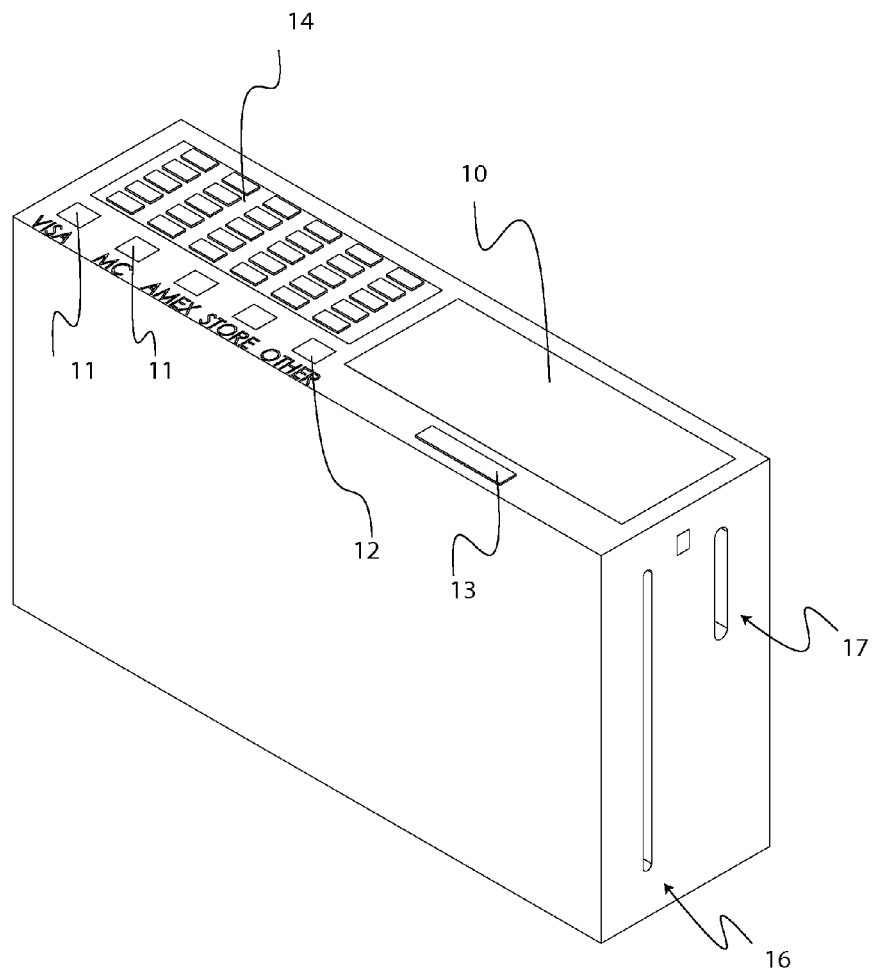
FIG. 2 is a right perspective view of the duplicator.

The card duplicator 1:

The card duplicator 1 is used only for business and family plans. In the business and family plans, the card duplicator 1 uploads the information from the old plastic or paper cards, which are in good condition, into the card duplicator 1 so that the information can be used. In references to FIG. 1 and FIG. 2, the card duplicator 1 comprises of a display window 10, a plurality of alpha-numerical display slots/keypad 11, a plurality of personalized alpha-numerical display slots/keypad 12, a start button 13, an alpha-numerical command pad 14, a power source 15, a plurality of card reader slots 16, and a plurality of data connection ports 17. The card duplicator 1 also comprises a front panel, a left panel, a right panel, a top, and a bottom panel. The display window 10 of the card duplicator 1 is located towards the left side of the front panel. The display window 10 comprises an indicator light 101, a plurality of alpha-numerical display slots 102, and a plurality of personalized alpha-numerical display slots 103. The start button 13 in the front panel is centrally positioned below the display window 10. The alpha-numerical command pad 14 is located towards the right side of the front panel. The plurality of card reader slots 16 is located on the right panel. The plurality of data connection ports 17 is located on the left panel and the right panel. The inside surface of the bottom panel is equipped with a central processing unit 18.

The plurality of card reader slots 16 has a reader/transmitter 161 connected from the inside. The card duplicator 1 uploads the information from the old cards and synchronized such information with the reader/transmitter 161. When the plastic cards are inserted into one of the plurality of card reader slots 16, The card duplicator 1 reads the data from a bar code or a magnetic strip of that particular card after the start button 13 is pressed. All of the other information that can't be obtained through the card reader slot 16 can be typed from the alpha-numerical command pad 14. The alpha-numerical command pad 14 sets desired locations for each card, and the alpha-numerical command pad 14 also uses in the personal data entry as input commands. The card duplicator 1 displays a small message confirming the accuracy of the data upon its entry. In the preferred embodiment, the alpha-numerical command pad 14 is designed as an actual keypad, but the alpha-numerical command pad 14 can also be designed as a touch pad. For security, if the input name is different from previously uploaded data, the present invention deems such data is invalid. Therefore, the programmable data cannot be uploaded. All data such as the user's name, address, date of birth and the last 4 digits of the social security number must match with data being uploaded.

The plurality of alpha-numerical display slots 102 is assigned to store credit cards or debit cards. Each owner/user can assign a single card to any single key but only one card can be assigned per each key. The plurality of personalized alpha-numerical display slots 103 is assigned for other related information such as: social security number and information, driver's license bar code information and picture, medical insurance card information, car registration information, auto insurance information, school information, college or work identification (ID) information and picture. The plurality of alpha-numerical display slots 102 and the plurality of personalized alpha-numerical display slots 103 are designed into the card duplicator 1 from two different methods depending on different models.

As for the first method, the plurality of alpha-numerical display slots 102 and the plurality of personalized alpha-numerical display slots 103 can be respectively stored into the plurality of alpha-numerical display slots/keypad 11 and the plurality of personalized alpha-numerical display slots/keypad 12. The plurality of alpha-numerical display slots 102 and the plurality of personalized alpha-numerical display slots 103 display the correct information through the display window 10 when the correct key is pressed form the plurality of alpha-numerical display slots/keypad 11 and the plurality of personalized alpha-numerical display slots/keypad 12 which provides a direct connection to the stored information. For example, when a key is pushed from either the plurality of alpha-numerical display slots/keypad 11 or the plurality of personalized alpha-numerical display slots/keypad 12, specific information related to that particular key displays the information on the display window 10. This is a much easier method for consumer groups like senior citizens because it eliminates any complications and keeps the operation of the present invention to its simplistic form.

As for the second method, both of the alpha-numerical display slots 102 and the personalized alpha-numerical display slots 103 are being displayed through the display window 10 but the information is stored in the internal memory. This method reduces the need of the separate keypads giving the card duplicator 1 much cleaner look. Users can select the correct information through the alpha-numerical command pad 14.

At least one data connection ports in the plurality of data connection ports 17 are being connected from the left and right panel in order to prevent any difficulties that the users might have. For example, if the card duplicator 1 is connected to a power outlet, the left panel of the card duplicator 1 faces towards the power outlet, and the left panel of the card duplicator 1 may not have enough space. In a situation like that, it is essential to have the at least one data connection ports on the right panel. On the other hand, if one of the inserted card in the plurality of card reader slots 16 is blocking the at least one data connection ports in the right panel, the at least one data connection ports in the left panel can be easily accessed.

The business personalized authentication security card (BPASC) 19 given for each buyer determines the authentication of the card duplicator 1. The card duplicator 1, the electronic wallet or e-wallet 4, the e-card 8, and the business personalized authentication security card (BPASC) 19 which is inserted in one of the card reader slots 16 must all be present and connected with an active internet access for activation and for any data input, upload, upgrade and deletion in the present invention. All points of the security system must match during this process. A password is also required to activate, upload, update, delete, or change any data such as expiration date of credit cards and security codes of bank and credit cards in the system. For example, to upgrade a credit card so that its expiration date can be changed, just remove the business personalized authentication security card (BPASC) 19; insert the new card; press the start button 13; when the information is prompted, just removed the card and finished the process of upgrading. The accuracy of the information exchange is confirmed by the indicator light 101. The indicator light 101 is connected from the inside of the display window 10. When the information is correct, the indicator light 101 flashes a color and if the information is incorrect, the indicator light 101 flashes a different color.

The card duplicator 1 has a power source 15 system. The power source 15 comprises a light and solar panel 151 and a DC charger 152 with an electrical fuse 1521. The light and solar panel 151 functions as the primary power source. The light and solar panel 151 is connected to the top panel or the front panel of the card duplicator 1 since these two panels have the maximum amount of area exposed to the light which results in maximum energy output. The light and solar panel 151 provides the most of the energy required for the card duplicator 1. Given the fact that the light and solar energy is a renewable energy, the light and solar panel 151 is the correct solution for the card duplicator 1, making the card duplicator 1 a green product. The DC charger 152 acts as the backup system for the light and solar panel 151. The electrical fuse 1521 which is connected with the DC charger 152 performs as a surge protector. The DC charger 152 is located in the left panel. The DC charger 152 can be either fixed to the left panel or can be positioned as a pull out extension cord. Since the DC charger 152 is not regularly used, the use of electricity is minimized while keeping the maintenance cost to its minimum.

The central processing unit 18 is positioned inside the card duplicator 1. The central processing unit 18 comprises a hard drive 181, a processor 182, a wireless internet card 183, an electronic programmable board 184, and an electronic circuitry 185. The electronic programmable board 184, the electronic circuitry 185, the hard drive 181, and the wireless internet card 183 are electronically connected to the processor 182.

The hard drive 181 has pre-loaded variable intermittent and random security codes that matches with the business personalized authentication security card (BPASC) 19, and the Reader/Transmitter 161. The hard drive 181 is equipped with some upgradable executable software for the operation of the card duplicator 1. JPEG and other picture formatting software are imbedded into the hard drive 181 and, the hard drive 181 also acts as the storage device when the information is loaded into the card duplicator 1. The wireless internet card 183 acts as a Wi-Fi system when the users need to transfer data from the card duplicator 1 to the electronic wallet or e-wallet 4. The same data transferring process can be also done with the data cable between the card duplicator 1 and the electronic wallet or e-wallet 4. The wireless internet card 183 also acts as a bridge for the remote server or its affiliates to stop any kind of illegal activity or illegally duplicating the system.

To prevent identity theft, the card duplicator 1 and the electronic wallet or e-wallet 4 have the same codes, serial numbers, series, and password which are synchronized and paired together. Data can be always stored or deleted by the authenticated user with the business personalized authentication security card (BPASC) 19 and the correct pre-loaded personal information. Electronic random verification confirms the input data, bank card, and credit card information with different institution and conducts periodically for all users as a security system to deter fraud.

The card duplicator 1 is manufactured with Environmental friendly, biodegradable, and recyclable light weight material. Therefore, the card duplicator 1 can be considered as a totally green product. Since the weight of the card duplicator 1 is considerably lowered, the card duplicator 1 can be easily moved around. The card duplicator 1 also has a compact size. Because of that compact size, the card duplicator 1 can be easily stored away when needed and takes up only a small storage space.

The Electronic Wallet or e-Wallet 4:

The electronic wallet or e-wallet 4 is the only required component that a single user need which uploads, updates, and communicates. The electronic wallet or e-wallet 4 unit can only be paired and synchronized with the preprogrammed e-card 8 with the same variable security codes. There is at least ten or more alpha-numerical security codes present in the electronic wallet or e-wallet 4. The same numbers are embedded in the e-card 8. The same security codes are also programmed with any replacement components.

Figure 3:
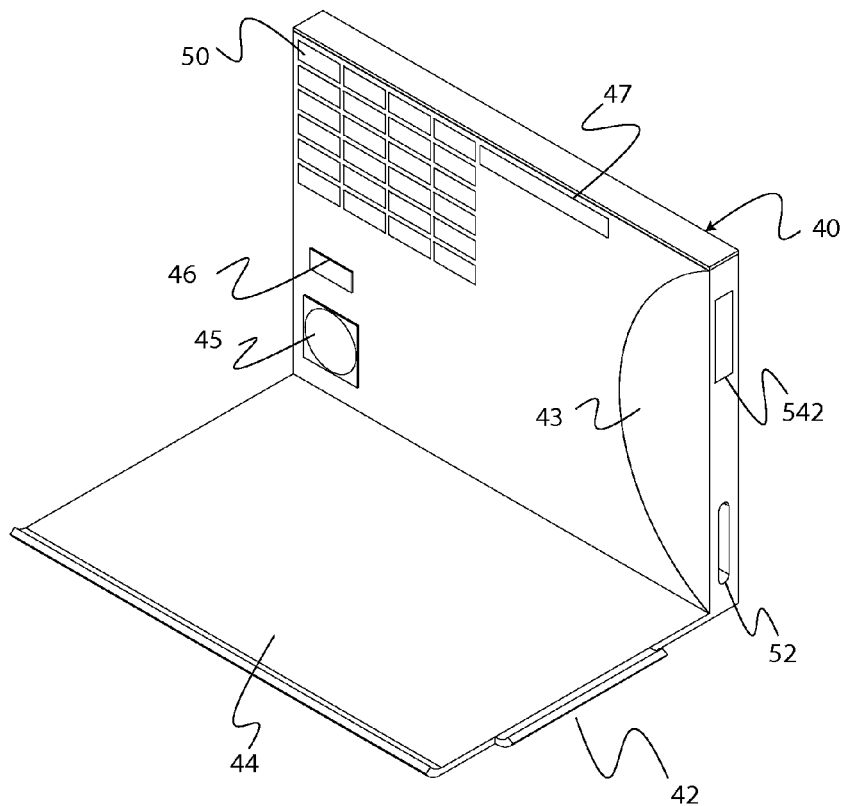
FIG. 3 is a perspective view of the electronic wallet.
Figure 4:
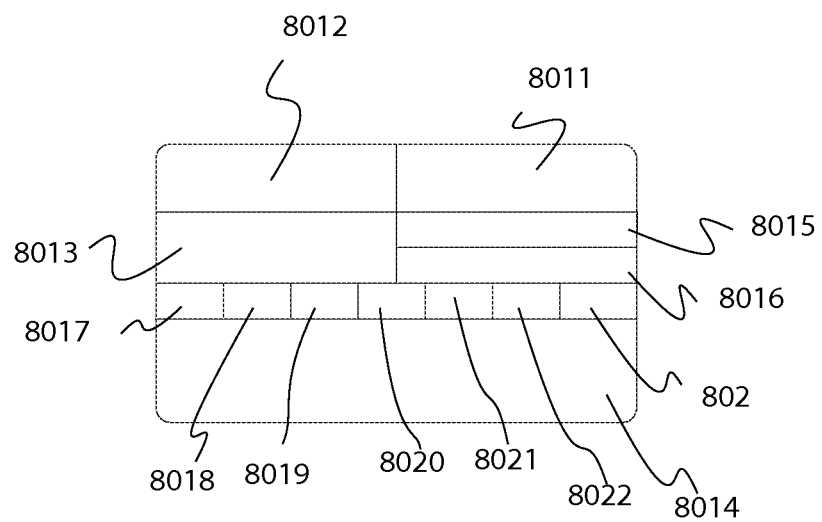
FIG. 4 is a front plan view of the e-card.

In references to FIG. 3 and FIG. 4 the electronic wallet or e-wallet 4 comprises a casing 40, a top cover 44, a plurality of wallet display windows 47, the personalized authentication security card (PASC) 53, a wallet power source 54, a wallet central processing unit 55, and a wallet accessories 56. The casing 40 comprises an outside compartment 41, a locking mechanism 42, a pouch 43, a wallet start button 45, a lock button 46, A plurality of wallet alpha-numerical display slots/keypad 48, A plurality of personalized wallet alpha-numerical display slots/keypad 49, A wallet alpha-numerical command pads 50, A wallet data connection port 51, A wallet card reader slot 52.

The top cover 44 is connected to the casing 40 from an end. The main purpose of the top cover 44 is to protect the top surface of the casing 40. The top cover 44 is designed in a way that it can be opened from a one side while the other side is still attached to the casing 40. The locking mechanism 42 is designed in the casing 40 which couples with the top cover 44 so that the top cover 44 can be securely closed with the top surface when required. The top cover 44 is made from high strength material in order to provide the necessary protection to the electronic wallet or e-wallet 4. The buyers have the opportunity to individualize the top cover 44 with different colors and designs, making the electronic wallet or e-wallet 4 a personalized product. The locking mechanism 42 is made from a hook and loop fastening mechanism or a current locking technology which provides the maximum protection. The electronic wallet or e-wallet 4 is designed to use regularly by its users, but some of the daily transaction requires paper money. As a solution for that, the outside compartment 41 is being designed into the electronic wallet or e-wallet 4 so that the users can safely keep paper money inside the compartment. The pouch 43 is also designed into the casing 40 as a storage compartment for the e-card 8.

In order to extract data from credit or debit cards, the plastic cards are inserted into the wallet card reader slot 52 which is positioned on the casing 40. When the plastic cards have been inserted into the card reading slot, a wallet reader/transmitter 521 in the electronic wallet or e-wallet 4 reads the data either from a bar code or a magnetic strip after the wallet start button 45 is pressed. The wallet start button 45 is also positioned on the casing 40.

The electronic wallet or e-wallet 4 uploads the information from the old cards and synchronize such information with the wallet reader/transmitter 521. The wallet reader/transmitter 521 also uploads the data from the electronic wallet or e-wallet 4 to the e-card 8. The lock button 46 on the electronic wallet or e-wallet 4 with the user's the password allows extra time for a merchant to photocopy a limited area of a specific card. The electronic wallet or e-wallet 4 automatically locks itself from an automatic locking system after the pre-set time, and the automatic locking system is also protected by a password. The automatic locking system is also activated through the lock button 46 so that the electronic wallet or e-wallet 4 can be locked any given time.

Information that can't be read through the wallet card reader slot 52 can be typed from the wallet alpha-numerical command pad 50 which is located on the casing 40. The wallet alpha-numerical command pad 50 also sets desired location for credit card and other data. The wallet alpha-numerical command pad 50 is also used in the personal data entry in the electronic wallet or e-wallet 4. The electronic wallet or e-wallet 4 displays a small message confirming the accuracy of the data upon its entry. The wallet alpha-numerical command pad 50 can be designed as actual keypad or as a touch pad. For security purpose, if the input name is different from previously uploaded data, the electronic wallet or e-wallet 4 deems such data is invalid. Therefore, programmable data cannot be completed. All of the preloaded data such as the user's name, address, date of birth, and the last 4 digits of the social security number must match with data being uploaded. The wallet data connection port 51 is positioned in the casing 40 which connects the electronic wallet or e-wallet 4 to the card duplicator 1 by the data cable. The data cable which connects between the wallet data connection port 51 powers the electronic wallet or e-wallet 4 during synchronization and pairing with the card duplicator 1. The wallet data connection port can be a universal serial bus (USB) port or any kind of current technology data transferring port.

The plurality of wallet display windows 47 is positioned on the casing 40. The plurality of wallet display windows 47 comprises a plurality of wallet alpha-numerical display slots 471, a plurality of personalized wallet alpha-numerical display slots 472, and a wallet indicator light 473. The plurality of wallet alpha-numerical display slots 471 displays the assigned credit cards information through the plurality of wallet display windows 47. The plurality of personalized wallet alpha-numerical display slots 472 displays for other related information such as, social security number and information, driver's license bar code information and picture, medical insurance card information, car registration information, auto insurance information, school information, college or work identification (ID) information and picture, through the wallet display window 47. The plurality of wallet alpha-numerical display slots 471 and the plurality of personalized wallet alpha-numerical display slots 472 can be functioned through the electronic wallet or e-wallet 4 from two different methods depending on different models.

As for the first method, a particular display slot of the plurality of wallet alpha-numerical display slots 471 is connected with a particular key in the plurality of wallet alpha-numerical display slots/keypad 48. Each of the owner/user can assign a single card to any particular key in the plurality of wallet alpha-numerical display slots/keypad 48. Only one card can be assigned in to the particular key of the plurality of wallet alpha-numerical display slots/keypad 48. Each display slot of the plurality of personalized wallet alpha-numerical display slots 472 is connected with a particular key in the plurality of personalized wallet alpha-numerical display slots/keypad 49. Each of the owner/user can assign a single input data to any key in the plurality of personalized wallet alpha-numerical display slots/keypad 49. Only one input data can be assigned in to the particular key of the plurality of personalized wallet alpha-numerical display slots/keypad 49. For example, the social security number, can be assigned into a one particular key in the plurality of personalized wallet alpha-numerical display slots/keypad 49, and no other information can be stored into that particular key. The plurality of wallet alpha-numerical display slots/keypad 48 and the plurality of personalized wallet alpha-numerical display slots/keypad 49 provide a direct connection to the plurality of wallet display windows.

As for the second method, the plurality of wallet alpha-numerical display slots 471 and the plurality of personalized wallet alpha-numerical display slots 472 are being displayed through one of the wallet display window in the plurality of display windows 47 but the information is stored in the internal memory. In this method, the electronic wallet or e-wallet 4 has less keypads which results in a much cleaner appearance for the electronic wallet or e-wallet 4. Users can select the correct information through the wallet alpha-numerical command pad 50.

The personalized authentication security card (PASC) 53 given for each user determines the authentication of the electronic wallet or e-wallet 4. The electronic wallet or e-wallet 4, the e-card 8, and the personalized authentication security card (PASC) 53 inserted in the electronic wallet or e-wallet 4 must all be present and connected with an active internet access for activation and for any data input, upload, upgrade and deletion in the present invention. All points of the security system must match during this process. A password is required to activate, upload, update, delete or change any data such as expiration date, and security codes of bank and credit cards in the system. For example, to upgrade a credit card so that its expiration date can be changed, just remove the personalized authentication security card (PASC) 53; insert the new card; press the wallet start button 45; when prompted, just remove the card and finish the upgrading process of the new card. The accuracy of the information exchange is confirmed by the wallet indicator light 473. The wallet indicator light 473 is electronically connected to one of the display windows in the plurality of wallet display windows 47. When the information exchange is confirmed, the wallet indicator light 473 flashes a color and if the information is incorrect, the wallet indicator light 473 flashes with a different color.

The wallet power source 54 system comprises a wallet light and solar panel 541 and a plurality of wallet batteries 542. The wallet light and solar panel 541 is the primary wallet power source 54, and the plurality of wallet batteries 542 acts as the backup system which is considered as the secondary wallet power system for the wallet light and solar panel 541. A charging unit for the plurality of batteries 542 is also provided with the present invention. The wallet light and solar panel 541 is positioned either on the casing 40 or the top cover 44. The wallet light and solar panel 541 is electronically connected with the wallet central processing unit 55. Since the top cover 44 and casing 40 have the maximum amount of area exposed to the light, the energy output is maximized. The wallet light and solar panel 541 provides the energy required for the electronic wallet or e-wallet 4. Given the fact that the light and solar energy is a renewable energy, the light and solar panel is the correct power source solution for the electronic wallet or e-wallet 4 making the present invention a green product.

The wallet central processing unit 55 is positioned inside the casing 40. The wallet central processing unit 55 comprises an electronic pre-programmed board 551, a wallet wireless internet card 552, a wallet hard drive 553, a wallet processor 554, and a circuitry strip 555. The electronic pre-programmed board 551, the wallet wireless internet card 552, the wallet hard drive 553, and the circuitry strip 555 are electronically connected to the wallet processor 554. The circuitry strip 555 uploads the activated data to the plurality of wallet display windows 47. The electronic wallet or e-wallet 4 uploads the data to the e-card 8 for immediate usage. All of the alpha-numerical security codes must match in all units; otherwise, a message "invalid" display in the electronic wallet or e-wallet 4 and "invalid e-card" is displayed in the e-card 8.

The electronic pre-programmed board 551 comprises a 911 locator 5511, a universal cellular phone unit 5512, a proprietary open wireless unit 5513, a voice recognition and command unit 5514 and a fingerprint recognition security unit 5515. All of the above components in the electronic pre-programmed board 551 can be either standard or optional features. The 911 locator 5511 is electronically connected with the electronic pre-programmed board 551. The 911 locator 5511 connects with the proper authorities in an emergency situation. The 911 locator 5511 is an efficient locating unit compare to the global positioning system (GPS) because the GPS system has difficulties in areas like underground tunnels and parking garages. The universal cellular phone unit 5512 is electronically connected to the electronic pre-programmed board 551. Since the cellular phone unit is universal, the users have the capability of selecting his or her own cellular phone network without limiting to a certain network. The proprietary open wireless unit 5513 is electronically connected with the electronic pre-programmed board 551. The proprietary open wireless unit 5513 provides the wireless connection between different devices like wireless speakers or a listening device. The fingerprint recognition security unit 5515 is positioned with the casing 40 and electronically connected with the electronic pre-programmed board 551. The fingerprint recognition security unit 5515 provides additional security to the electronic wallet or e-wallet 4. The voice recognition and command unit 5514 is electronically connected with the electronic pre-programmed board 551. The voice recognition and command unit 5514 may consider as a luxury feature for most of the users, but it is a valuable addition for users who has physical limitations.

The wallet wireless internet card 552 provides internet access through the present invention. The wallet wireless internet card 552 also acts as a bridge for the remote server or its affiliates to stop any kind of illegal activity or illegally duplicating the system.

The wallet hard drive 553 has pre-loaded variable intermittent and random security codes that matches with the personalized authentication security card (PASC) 53, the e-card 8, and the wallet reader/transmitter 521. For security purpose, the wallet hard drive 553 functions as a non-input device for family and business plans. The wallet hard drive 553 is equipped with upgradable executable software and a plurality of applications for the operation of the unit present invention. JPEG and other picture formatting software is imbedded into the wallet hard drive 553 and the wallet hard drive 553 also acts as the storage device when the information is loaded into the electronic wallet or e-wallet 4. The executable software allows the transmission of data to the e-card 8 on command of the pre-loaded keys that were assigned during uploading. The plurality of applications can be embedded into the present invention and these applications are either standard or optional. Users have the ability of electronic money depositing, book keeping for single or multiple accounts with merging capability, obtaining the currency exchange rates for most countries, transferring money between accounts, and scheduling electronic bill payments. The users also receive payment reminders, account balance and credit limit, stock market reports and updates, electronic statements from the financial institutions, and automatic credit and debit card updates. The users are able use a budget planner, an expense tracker, a wireless printing options, electronic credit/debit cards insurance and disclaimer information and upgradable medical information with barcode inscriptions so the medical alert files can be synchronized with medical institutions. The medical upload and file transfer allows the owner of the present invention upload a specific medical information from one medical office to another. The doctors can also transfer and update medical history in encrypted format.

The plurality of wallet accessories 56 can be either standard or optional also. The plurality of wallet accessories 56 comprise a secure digital (SD) card slot 561, a pair of universal serial bus (USB) ports, a pair of speakers 563, a headphone adapter 564, a scanner 565, a camera 566, an automatic world clock 569, a calculator 568, and a global positioning system (GPS) 567. A secure digital card in the SD card slot 561 is used as additional data storage space for the electronic wallet or e-wallet 4. The SD card slot 561 is connected to the casing 40 of the electronic wallet or e-wallet 4. Users are able to store videos, pictures, music and other data so that the stored data can be used through the electronic wallet or e-wallet 4. Since most of these stored data periodically change during the use of the electronic wallet or e-wallet 4, it is convenient to have the data stored in the secure digital card and use that data through the SD card slot 561. Because of the secure digital card, users of the present invention don't have waste time make the necessary data changes to the electronic wallet or e-wallet 4. The pair of USB ports 562 is connected to the casing 40 and the pair of USB ports 562 provide added flexibility to the user if the user wants additional devices attached to the electronic wallet or e-wallet 4. For example, the charging unit can be connected to the electronic wallet or e-wallet 4 from one of the USB port in the pair of USB ports 562. The pair of speakers 563 and the headphone adapter 564 are connected to the casing 40. The pair of speakers 563 executes all of the sound effects in the electronic wallet or e-wallet 4. If the users want some privacy, the users can connect an external headphone set to the headphone adapter 564. The scanner 565 and the camera 566 are connected to the casing 40. The scanner 565 and the camera 566 perform like an ordinary scanner and camera. The automatic world clock 569 and the calculator 568 are connected to the casing 40. The automatic clock has an upgradeable application so that the automatic world clock 569 automatically changes into the correct time zone depending on the location of the present invention. The calculator 568 is connected to a spreadsheet program which displays through one of the wallet display window in the plurality of display windows 47. The GPS 567 is connected to the top cover 44. The GPS 567 is embedded with many upgradable applications. The GPS 567 is positioned on the top cover 44 so that the user can operate the GPS 567 without opening the e-wallet 4. Radio wave technology also added to the present invention for broader usage and comfort of the users.

To prevent identity theft, only the e-card 8 and the electronic wallet or e-wallet 4 have the same codes, serial numbers, series, and password synchronized and paired. In family or business plans, the card duplicator 1 has the same codes, serial numbers, series, and password synchronized and paired with the e-card 8 and the electronic wallet or e-wallet 4. Such transfer is done through the wallet card reader slot 52. Data can always be stored or deleted by the authenticated user with the personalized authentication security card (PASC) 53 and pre-loaded personal information. Electronic random verification checks/confirmations of data input, bank card and credit card information with different institution is done periodically for all users as a security system to deter fraud.

The electronic wallet or e-wallet 4 is manufactured with Environmental friendly, biodegradable, and recyclable light weight material making the present invention a totally green product. The weight of the electronic wallet or e-wallet 4 is considerably lowered. The compact size of the electronic wallet or e-wallet 4 makes the electronic wallet or e-wallet 4 easy carrying device and easy to store. The electronic wallet or e-wallet 4 feels like a normal leather wallet. Users don't feel any differences using the electronic wallet or e-wallet 4 compare to the normal leather wallet. The entire components and the assembly of the electronic wallet or e-wallet 4 are done to the perfection making the electronic wallet or e-wallet 4 water resistance.

The e-Card 8:

The e-card 8 is the interface device and the e-card 8 does not have interactive data input. The e-card 8 is designed as the same size as the conventional cards. The electronic wallet or e-wallet 4 temporary unlocks or loads the e-card 8 for usage. Data is loaded or unlocked based on the selection of the owner/user. Users can use and swipe the e-card 8 just like the regular credit card.

Figure 5:
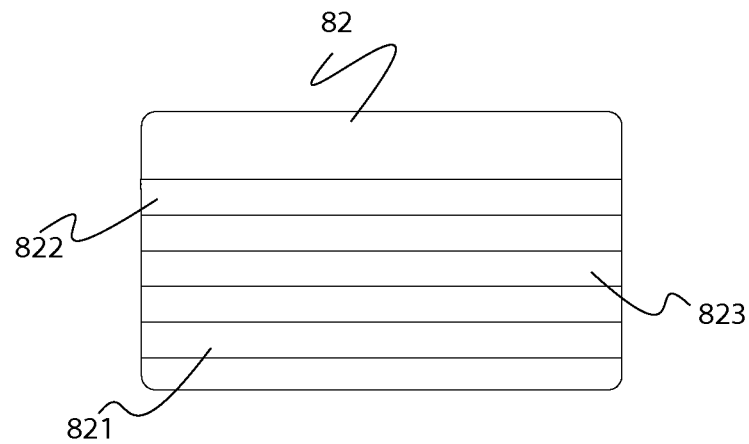
FIG. 5 is a back plan view of the e-card.
Figure 6:
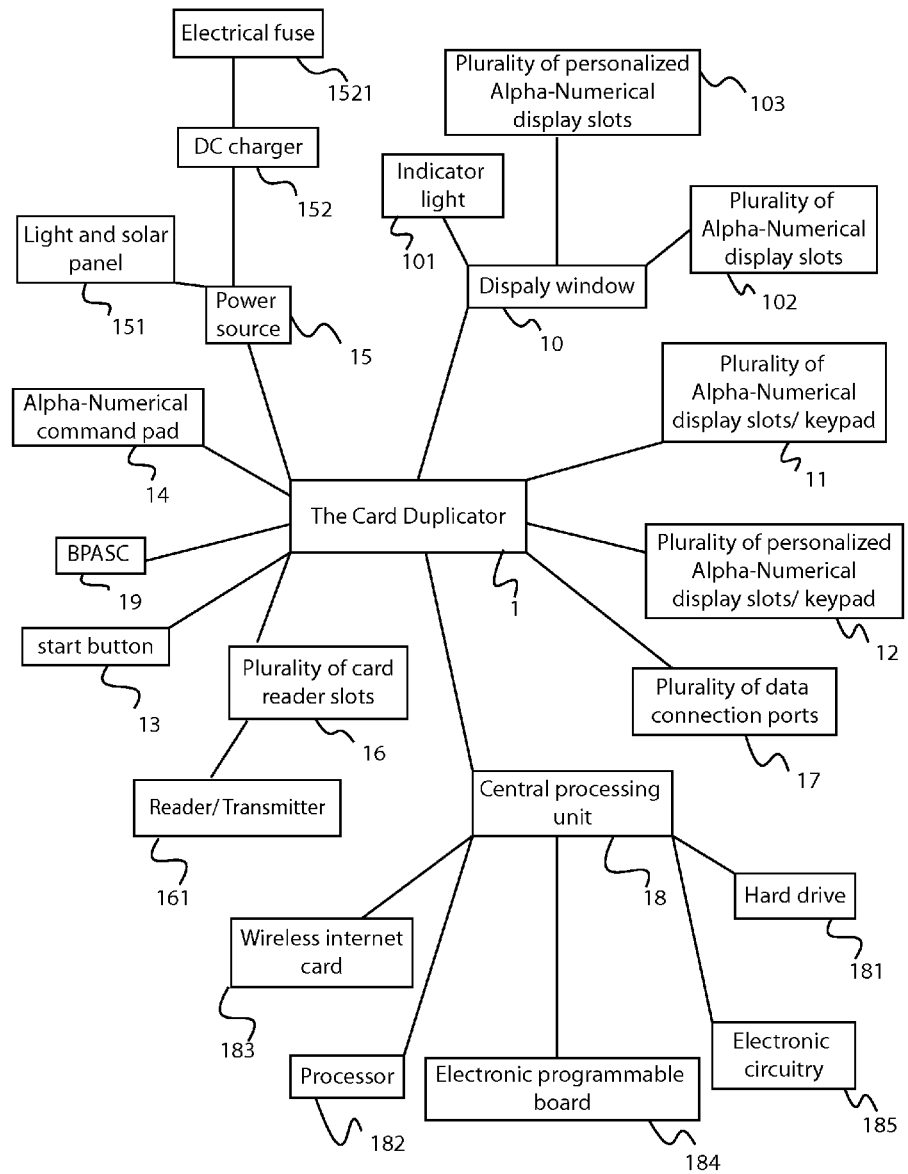
FIG. 6 is view of the system for the card duplicator.
Figure 7:
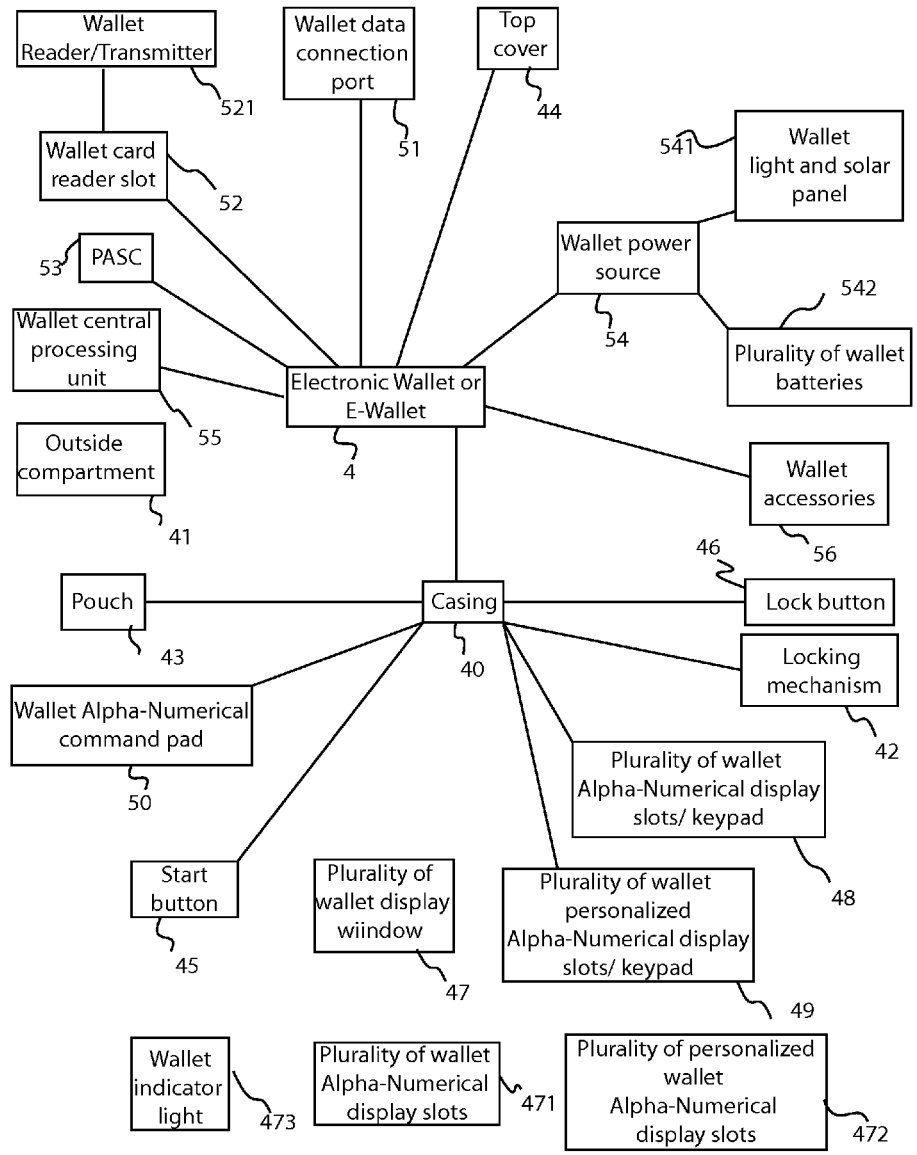
FIG. 7 is view of the system for the electronic wallet.
Figure 8:
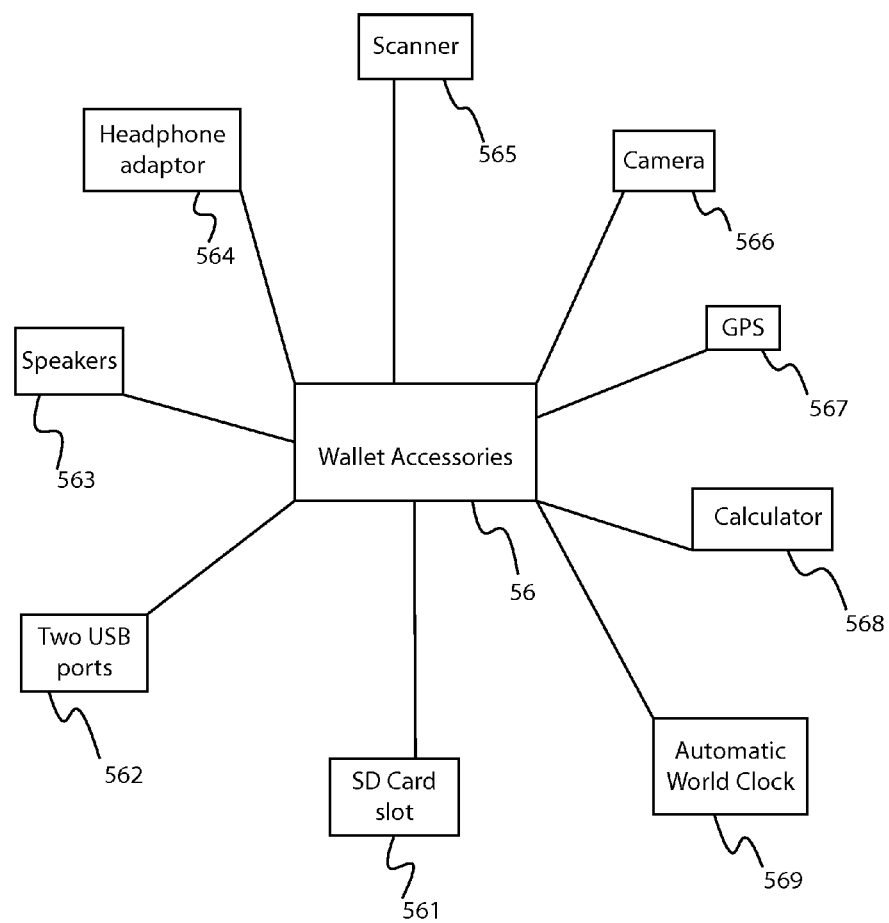
FIG. 8 is view of the system for the wallet accessories.
Figure 9:
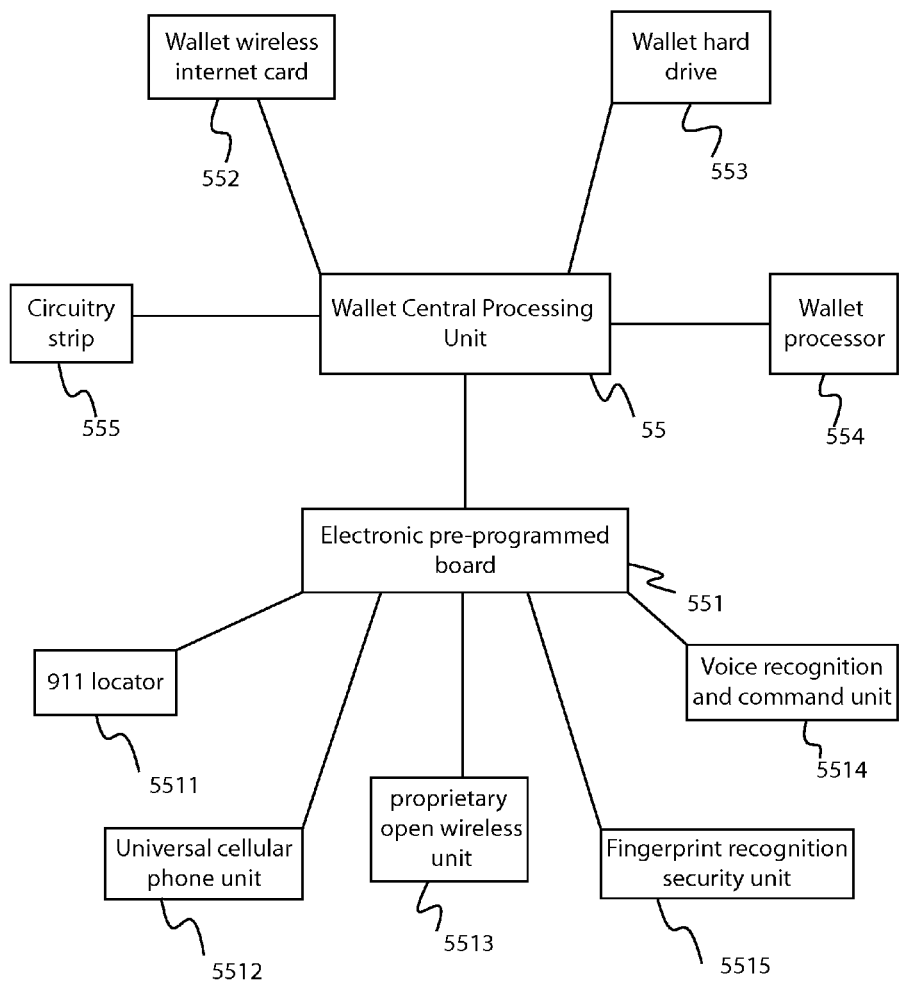
FIG. 9 is view of the system for the wallet central processing unit.
Figure 10:
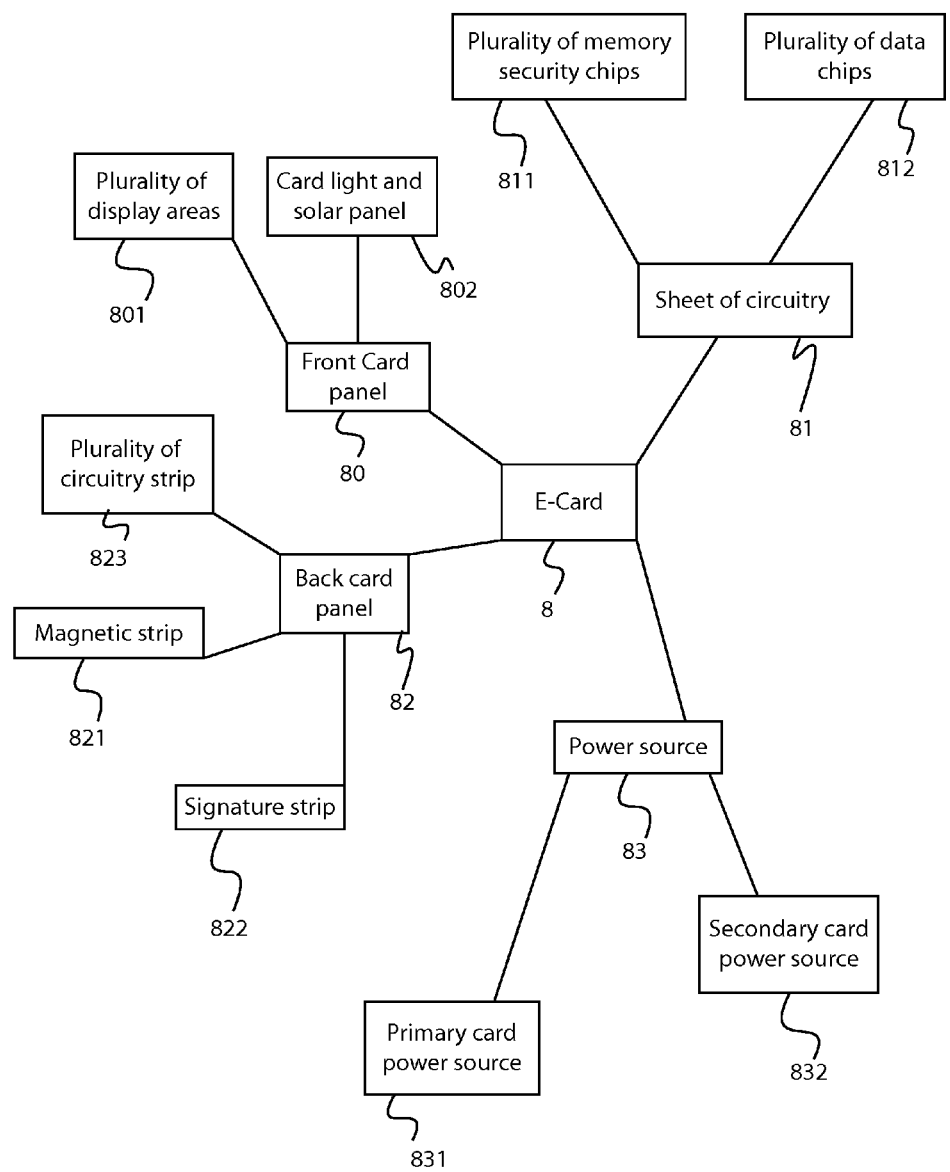
FIG. 10 is view of the system for the e-card.

The e-card 8 is fabricated with three interlocked/fused parts. In reference to FIG. 5 and FIG. 6 the e-card 8 comprises a front card panel 80 and a back card panel 82. The front card panel 80 and the back card panel 82 being connected to each other with a middle card panel. The middle card panel is positioned below the front card panel 80 but above from the back card panel 82. The front card panel 80 comprises a plurality of display areas 801 and a card light and solar panel 802. The plurality of display areas is connected to a power source 83. The middle card panel comprises a plurality of memory security chips 811, a sheet of circuitry 81, and a plurality of data chips 812. The plurality of memory security chips 811 and the plurality of data chips 812 are implanted into the sheet of circuitry 81. The back card panel 82 comprises a magnetic strip 821, a signature strip 822, and a plurality of circuitry strips 823. The plurality of circuitry strips 823 is connected with the magnetic strip 821.

The plurality of display areas 801 in the e-card 8 is pre-determined. A specific pre-determined window in the top right corner, a picture display area 8011, displays picture of the owner of the card. The e-card 8 offers a selection and extensive database of personalized design options such as Team logos, screen shots of nature, animals, or any owner of the system can upload legal displayable personal expression to be printed on a logo display area 8012 on the top left area of the e-card 8. This area is reserved for logos and legal expressions only. A member name area 8013 displays the name of the member and positioned under the logo display area 8012. Different pre-determined display areas are assigned for each of the data input. All of these pre-determined display areas are positioned below the member name area 8013. These display areas are occupy information about a card issuer's name area 8019 (bank name), a member since area 8020, a card number area 8014, an expiration date area 8021, a card logo area 8017 (Visa, Amex, Master Card, etc), a security code area 8022, and a variable security codes area 8018 from the electronic wallet or e-wallet 4. A merchant contact information area 8016 and an ID data display area 8015 are positioned below the picture display area 8011.

The sheet of circuitry 81 is considered as the middle card panel. The plurality of memory security chips 811 and the plurality of data chips 812 implanted in the sheet of circuitry 81 are pre-loaded with executable programs. The plurality of data chips 812 holds the uploaded data in the e-card 8. Some of the memory security chips 811 are preloaded with security and personal codes. All of the information about different cards can be stored in one of the memory security chip 811 and can be activated for display by the electronic wallet or e-wallet 4. The lock button 46 on the electronic wallet or e-wallet 4 with the user's password allows extra time for a merchant to photocopy a limited area of the specific card being used. After the specific time has passed through, the pre-loaded program in one of the data chip is activated and shuts down the particular display area.

The plurality of circuitry strips 823 that are connected with the magnetic strip 821 uploads or unlocks a selected card data to the magnetic strip 821. The magnetic strip 821 acts as a normal magnetic strip 821 in the traditional plastic credit card. The magnetic strip 821 has two functions. The first function of the magnetic strip 821 is to upload data from the electronic wallet or e-wallet 4 when the e-card 8 is connected with the electronic wallet or e-wallet 4. As the second function, the magnetic strip 821 unloads the necessary information when the e-card 8 is swiped through credit card machine.

The power source 83 of the e-card 8 comprises a primary card power source 831 and a secondary card power source 832. The primary card power source 831 is powered by the card light and solar panel 802 on the top surface of the front card panel 80. Since the card is held by its user facing the plurality of display areas 801 towards the user, the solar panel should be positioned on the top surface of the front card panel 80 which produces the maximum amount of light energy. The secondary card power source 832 can be a mini battery or a current technology depending on the most efficient system. The primary card power source and the secondary card power source are electronically connected to the sheet of circuitry.

The e-card 8 enhances personal data security by ten folds. Only the assigned e-card 8 with same alpha-numerical security code as the electronic wallet or e-wallet 4 is able to communicate and transfer data. All security codes must match or the card doesn't display any data or a massage. The signature strip 822 is put in place to ensure the authentication of the e-card 8 to its user so that the users have additional protection.

The e-card 8 is produced of environmental friendly materials. All parts are recyclable and biodegradable making the e-card 8 a green product. The e-card 8 is water resistant so that the users do not have to worry about the water or moisture get into the e-card 8. Having the e-card 8 as a water resistance device increases the life span of the e-card 8 giving it a longer shelf life. Users also get to choose the color of the e-card 8 upon their preference. The color selection provides a personalized finish into the e-card 8. Later on, users are able to select the e-card 8 according to their financial capabilities. The e-card 8 outer skin's material is colored according to their financial capabilities making the pearl or platinum color as the highest and followed by the gold color and the silver color.

Although the invention has been explained in relation to its preferred embodiment, it is to be understood that many other possible modifications and variations can be made without departing from the spirit and scope of the invention as hereinafter claimed.

What is claimed is:

1. A smart electronic wallet or smart e-wallet comprises,
a card duplicator;
a electronic wallet or e-wallet;
an e-card;
the card duplicator comprises a business personalized authentication security card, and a data cable;
the electronic wallet or e-wallet comprises a personalized authentication security card;
the business personalized authentication security card being connected with the card duplicator;
the data cable being connected to the card duplicator;
the electronic wallet or e-wallet being connected with the personalized authentication security card and the e-card; and
the data cable being connected with the electronic wallet or e-wallet from the opposite end.

2. The smart electronic wallet or smart e-wallet as claimed in claim 1 comprises,
the card duplicator comprises, a front panel, a left panel, a right panel, a power source, and a central processing unit;
the power source comprises a light and solar panel and a dc charger;
the dc charger comprises an electrical fuse;
the electrical fuse being connected to the dc charger; and
the central processing unit comprises a hard drive, a processor, a wireless internet card, an electronic programmable board, and an electronic circuitry.

3. The smart electronic wallet or smart e-wallet as claimed in claim 2 comprises,
the power source being connected to the card duplicator from the left panel; and
the central processing unit being connected to the card duplicator from the inside.

4. The smart electronic wallet or smart e-wallet as claimed in claim 2 comprises,
the front panel comprises a display window, a start button, a plurality of alpha-numerical display slots/keypad, a plurality of personalized alpha-numerical display slots/keypad, and an alpha-numerical command pad;
the display window being connected to the front panel;
the start button being connected below the display window;
the alpha-numerical command pad being connected adjacent to the window;
the plurality of alpha-numerical display slots/keypad, and the plurality of personalized alpha-numerical display slots/keypad being connected to the front panel; and
the plurality of alpha-numerical display slots/keypad, and the plurality of personalized alpha-numerical display slots/keypad being electronically connected to the display window.

5. The smart electronic wallet or smart e-wallet as claimed in claim 2 comprises,
the display window comprise an indicator light, a plurality of alpha-numerical display slots, and a plurality of alpha-numerical display slots;
the indicator light being electronically connected within the display window;
the plurality of alpha-numerical display slots being electronically connected with the display window;
the plurality of personalized alpha-numerical display slots being electronically connected within the display window;
the plurality of alpha-numerical display slots and the plurality of personalized alpha-numerical display slots being connected with the plurality of alpha-numerical command pad; and
the display window being electronically connected to the processor.

6. The smart electronic wallet or smart e-wallet as claimed in claim 2 comprises,
the left panel comprises at least one data connection port and the power source;
the at least one data connection ports being positioned against the left panel;
the at least one data connection ports being electronically connected to the processor;
the light and solar panel being connected against the front panel;
the light and solar panel being electronically connected with the processor; and
the dc charger being connected with the processor.

7. The smart electronic wallet or smart e-wallet as claimed in claim 2 comprises,
the right panel comprises a plurality of card reader slots, and the at least one data connection port;
the plurality of card reader slot being connected with the right panel;
the at least one data connection port being connected with the right panel;
the plurality of card reader slots being connected with the processor; and the at least one data connection port being connected with the processor.

8. The smart electronic wallet or smart e-wallet as claimed in claim 7 comprises,
the plurality of card reader slots comprises a reader/transmitter; and
the reader/transmitter being connected with the processor.

9. The smart electronic wallet or smart e-wallet as claimed in claim 3 comprises,
the hard drive being electronically connected with the processor;
the wireless internet card being electronically connected with the processor;
the electronic programmable board being electronically connected with the processor; and
the electronic circuitry being electronically connected with the processor.

10. The smart electronic wallet or smart e-wallet as claimed in claim 1 comprises,
the electronic wallet or e-wallet comprises a casing, a top cover, a plurality of wallet display windows, a wallet power source, a wallet central processing unit, and wallet accessories;

the top cover being connected to the casing from an end;
the plurality of wallet display windows being connected to the casing;
the wallet power source being connected to the casing;
the wallet central processing unit being positioned inside the casing; and
the wallet accessories being connected to the casing.

11. The smart electronic wallet or smart e-wallet as claimed in claim 10 comprises,
the casing comprises an outside compartment, a locking mechanism, a pouch, a wallet start button, a lock button, a wallet alpha-numerical command pad, a plurality of wallet alpha-numerical display slots/keypad, a plurality of personalized wallet alpha-numerical display slots/keypad, a wallet data connection port, and a wallet card reader slot;
the outside compartment being connected to the casing;
the locking mechanism being positioned between the casing and the top cover;
the pouch being connected to the casing;
the wallet start button being connected to the casing;
the lock button being connected to the casing;
the alpha-numerical command pad being connected to the casing;
the plurality of wallet alpha-numerical display slots/keypad and the plurality of personalized wallet alpha-numerical display slots/keypad being connected to the casing; and
the wallet data connection port and the wallet card reader slot being positioned on the casing.

12. The smart electronic wallet or smart e-wallet as claimed in claim 11 comprises,
the plurality of wallet alpha-numerical display slots/keypad and the plurality of personalized wallet alpha-numerical display slots/keypad being electronically connected to one of the wallet display window;
the wallet starting button being electronically connected to the wallet central processing unit;
the lock button being electronically connected to the wallet central processing unit;
the wallet data connection port and the wallet card reader slot being electronically connected to the wallet central processing unit;
the wallet card reader slot comprises a wallet reader/transmitter; and
the wallet reader/transmitter being electronically connected to the wallet card reader slot.

13. The smart electronic wallet or smart e-wallet as claimed in claim 10 comprises,
the plurality of wallet display windows comprise a wallet indicator light, a plurality of wallet alpha-numerical display slots, and a plurality of wallet personalized alpha-numerical display slots;
the plurality of wallet display windows being electronically connected with the wallet central processing unit;
the wallet indicator light being electronically connected into one of the wallet display window;
the plurality of wallet alpha-numerical display slots and the plurality of personalized wallet alpha-numerical display slots being electronically connected to one of the wallet display window; and
the plurality of wallet alpha-numerical display slots and the plurality of personalized wallet alpha-numerical display slots being electronically connected with the wallet alpha-numerical command pad.

14. The smart electronic wallet or smart e-wallet as claimed in claim 10 comprises,
the wallet power source being electronically connected to the wallet central processing unit;
the wallet power source comprises a wallet light and solar panel and a plurality of wallet batteries;
the wallet light and solar panel being positioned on the casing;
the plurality of wallet batteries being positioned inside the casing;
the wallet light and solar panel being electronically connected to the plurality of wallet batteries;
the wallet central processing unit comprises, an electronic pre-programmed board, a wallet wireless internet card, a wallet hard drive, a wallet processor, and a circuitry strip;
the circuitry strip being connected to the wallet processor;
the wallet hard drive being connected to the wallet processor;
the wallet wireless internet card being connected to the wallet processor; and
the electronic pre-programmed board being connected to the wallet processor.

15. The smart electronic wallet or smart e-wallet as claimed in claim 14 comprises,
the electronic pre-programmed board comprises a 911 locator, a universal cellular phone unit, a proprietary open wireless unit, a voice recognition and command unit, and a fingerprint recognition security unit;
the 911 locator being electronically connected to the electronic pre-programmed board;
the universal cellular phone unit being electronically connected to the electronic pre-programmed board;
the proprietary open wireless unit being electronically connected to the electronic pre-programmed board;
the voice recognition and command unit being electronically connected to the electronic pre-programmed board; and
the fingerprint recognition security unit being electronically connected to the electronic pre-programmed board.

16. The smart electronic wallet or smart e-wallet as claimed in claim 10 comprises,
the plurality of wallet accessories comprises a secure digital card slot, a pair of universal serial bus ports, a pair of speakers, a headphone adapter, a scanner, a camera, a global positioning system, a automatic world clock and a calculator;
the secure digital card slot being connected to the casing;
the pair of universal serial bus ports being connected to the casing;
the pair of speakers being connected to the casing;
the headphone adapter being connected with casing;
the scanner and the camera being connected with the casing;
the automatic world clock and the calculator being connected with the casing; and
the global positioning system being connected to the top cover.

17. The smart electronic wallet or smart e-wallet as claimed in claim 1 comprises,
the e-card comprises a front card panel, a middle card panel, and a back card panel;
the front card panel comprises a plurality of display areas and a card light and solar panel;
the middle card panel comprises, a plurality of memory security chips, a sheet of circuitry, a plurality of data chips, and a power source; and the back card panel comprises a magnetic strip, a signature strip, and a plurality of circuitry strips.

18. The smart electronic wallet or smart e-wallet as claimed in claim 17 comprises,
the middle card panel being positioned between the front card panel and the back card panel;
the front card panel being connected to the middle card panel from top; and
the back card panel being connected to the middle card panel from below.

19. The smart electronic wallet or smart e-wallet as claimed in claim 17 comprises,
the plurality of display areas being positioned in the front card panel;
the plurality of display areas comprise a picture display area, a logo display area, a member name area, a card number area, a id data display area, a merchant contact information area, a card logo area, a variable security codes area, a card issuer's name area, a member since area, a expiration data area, and a security code area;
the plurality of memory security chips being connected into the sheet of circuitry;
the plurality of data chips being connected into the sheet of circuitry;
the magnetic strip being connected to the back card panel from;
the plurality of circuitry strips being connected with the magnetic strip from;
the signature strip being positioned into the back card panel;
the light and solar panel being positioned in the front card panel;
the power source comprises a primary card power source and a secondary card power source;
the primary card power source being connected to the plurality of display area;
the secondary card power source being connected into the sheet of circuitry from one end; and
the secondary card power source being connected to the primary card power source.

* * * * *